April 17, 1962 S. F. PAULEY ETAL 3,029,565
APPARATUS FOR CROWNING BLANKS OF RESILIENT FOAM MATERIAL
Filed Jan. 26, 1960 6 Sheets-Sheet 1

INVENTORS
STANLEY F. PAULEY
ROY G. CECIL
BY
Church & Church
ATTORNEYS

INVENTORS
STANLEY F. PAULEY
ROY G. CECIL
BY
Church & Church
ATTORNEYS

INVENTORS
STANLEY F. PAULEY
ROY G. CECIL
BY
Church & Church
ATTORNEYS

April 17, 1962 S. F. PAULEY ETAL 3,029,565
APPARATUS FOR CROWNING BLANKS OF RESILIENT FOAM MATERIAL
Filed Jan. 26, 1960 6 Sheets-Sheet 6

INVENTORS
STANLEY F. PAULEY
ROY G. CECIL
BY
Church & Church
ATTORNEYS

United States Patent Office 3,029,565
Patented Apr. 17, 1962

3,029,565
APPARATUS FOR CROWNING BLANKS OF RESILIENT FOAM MATERIAL
Stanley F. Pauley and Roy G. Cecil, Richmond, Va., assignors to E. R. Carpenter Company, Inc., Richmond, Va., a corporation of Virginia
Filed Jan. 26, 1960, Ser. No. 4,656
18 Claims. (Cl. 51—135)

This invention relates to apparatus for crowning resilient blanks of foam material such as seat cushion blanks, or the like, and more particularly to apparatus for forming smoothly rounded corner edges on blanks of the foregoing type by an abrasive process.

In recent years, a substantial commercial demand has arisen for crowned seat cushions of resilient foam material such as foam rubber or urethane foam. The usual manner of manufacturing crowned cushions is to mold the cushion, usually in upper and lower halves which may be internally cored. After the molding operation, the formed halves are joined to each other to form the completed cushion. This process is relatively inefficient from a manufacturing standpoint since the productive output is obviously limited by the number of molds and the time required to complete the molding and joining processes. Further, a given mold can produce only cushions of a fixed size and configuration.

It is a primary object of this invention to provide apparatus for producing crowned cushions of resilient material such as urethane foam or the like having a high productive capacity and adapted to produce crowned cushions of widely varying dimensions.

Another object of the invention is to provide apparatus for crowning cushion blanks of resilient materials such as urethane foam or the like, which blanks may be in block-like form having flat surfaces of dimensions which may vary widely within reasonable limits.

To form cushions in accordance with the present invention, the cushion material is initially molded into a relatively large rectangular block form. The molded block is then cut into a plurality of cushion blanks which, in the usual case, are in the form of rectangular parallelopipeds. The blanks are then crowned upon apparatus embodying the invention by abrading the corner edges of the blank to round the squared edges into smooth convex curves.

The apparatus for crowning cushion blanks basically includes some means defining a planar abrading surface such as a belt sander, the width of the abrading surface preferably being greater than the longest edge dimension of cushions to be crowned upon the machine. The abrading means is supported in a machine frame with the plane of the abrading surface vertically inclined and a cushion blank supporting table is mounted with its front edge extending horizontally across the abrading surface. A cushion to be crowned is placed upon the table and the table and cushion are located so that the abrading surface passes upwardly and inwardly of the blank across the upper front corner edge at a relatively small acute angle to the front side surface. The initial positioning of the cushion blank and table thus forms an inwardly inclined surface extending across the upper portion of the front side surface engaged with the abrading surface. The cushion is then pivoted about horizontal axes so that the upper surface of the blank is moved toward parallel relationship with the abrading surface. This action forms a convexly curved or crown surface extending between the side surface engaged by the abrading surface and the upper surface of the cushion blank. The foregoing process is repeated on each edge of the cushion.

Other objects and features of the invention will become apparent by reference to the following specification taken in conjunction with the accompanying drawings.

Figure 1:
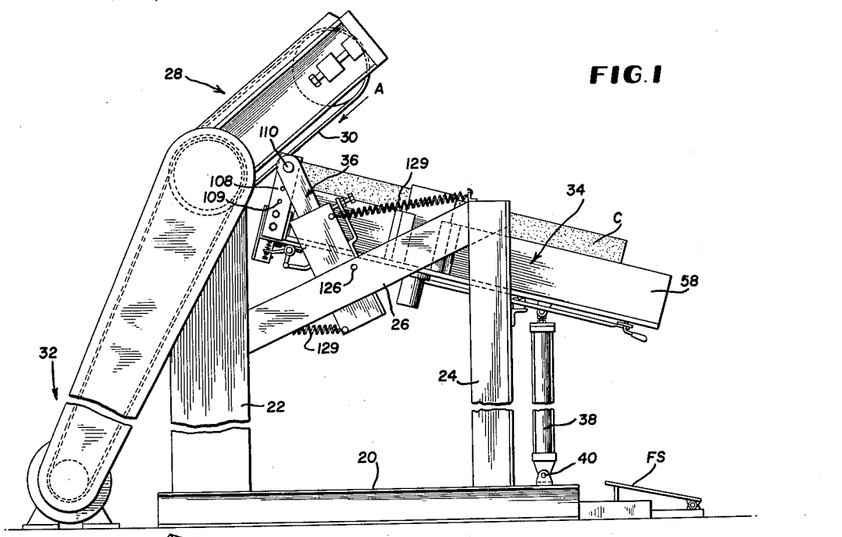
FIG. 1 is a left side elevational view of one form of machine embodying the present invention.
Figure 2:
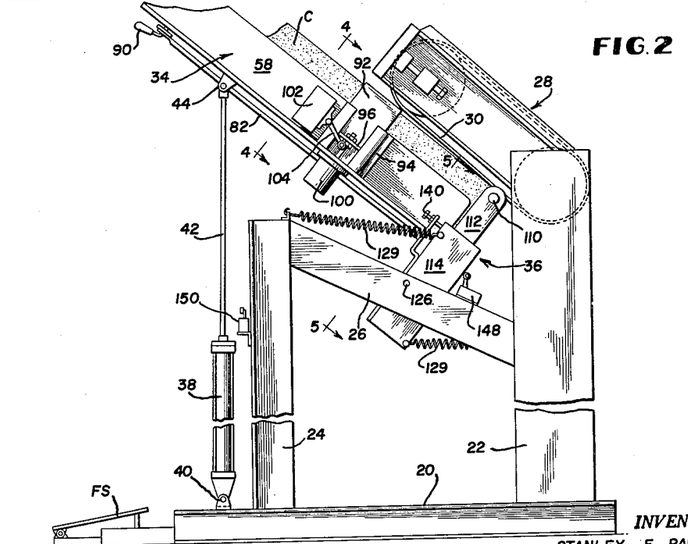
FIG. 2 is a right side elevational view of the machine of FIG. 1 showing certain parts of the machine in different positions than is shown in FIG. 1.

Referring first to FIGS. 1 and 2, one exemplary form of the invention includes a machine frame having a base 20 to which are fixedly secured vertical legs 22 and 24. An inclined box frame member 26 interconnects the legs on both sides of the machine. At the upper end of legs 22, a belt sander assembly designated generally 28 is supported and includes horizontal end rolls 29 about which are trained an endless abrasive belt 30 of substantial transverse width whose operative run is located in a vertically inclined plane extending transversely across the machine. Belt 30 is driven by a motor driven belt assembly designated generally 32 in a direction such that the operative run of the belt moves downwardly as indicated by the arrow A in FIG. 1. Apart from the substantial width of the belt, sander assembly 28 is of conventional construction and since the structural details of assembly 28 do not, per se, form part of the present invention, further description of this assembly will be omitted.

Cushion blanks C to be crowned are supported upon the machine by a table assembly designated generally 34 which is supported at each side upon the box frame members 26 by a linkage assembly designated generally 36 which will be described in greater detail below. Basically the linkage assembly 36 permits table assembly 34 to be pivoted between a normal or rest position shown in FIG. 1 and an elevated position shown in FIG. 2. Table assembly 34 is driven between the FIG. 1 and FIG. 2 positions by an air motor including a cylinder 38 pivotally supported upon the frame as at 40 and a piston assembly including a piston rod 42 pivotally connected to table assembly 34 as at 44.

Details of table assembly 34 are best shown in FIGS. 3–8. The table includes a main base plate member 46 of rectangular shape. An angle member 48 is rigidly secured along the front edge (left edge in FIGS. 6 and 7) of plate 46 and projects outwardly slightly beyond each side of the plate. A front plate 50 is secured to the vertical web of angle 48 and projects upwardly above the angle to close the gap between base plate 46 and belt 30. A vertically adjustable clamp connection 52 between angle 48 and plate 50 allows plate 50 to be raised as its top edge is abraded by the belt and in addition is varied as the linkage position is changed.

A cushion support plate assembly 54 of light weight sheet metal material is located on the top surface of base plate 46 and includes a main plate 56 detachably secured to base plate 46 by suitable means, not shown, and opposed vertical side plates 58 independently fixed to plate 46 and extending rearwardly along the sides of plate 56 at right angles to front plate 50.

Plate 56 is detachably secured to base plate 46, so that different plates may be interchangeably employed upon the machine. Plates 56 of different thickness are employed with cushion blanks of different thickness or the configuration of the crown may be modified in accordance with the thickness of the particular plate 56 employed.

Figures 6, 8:
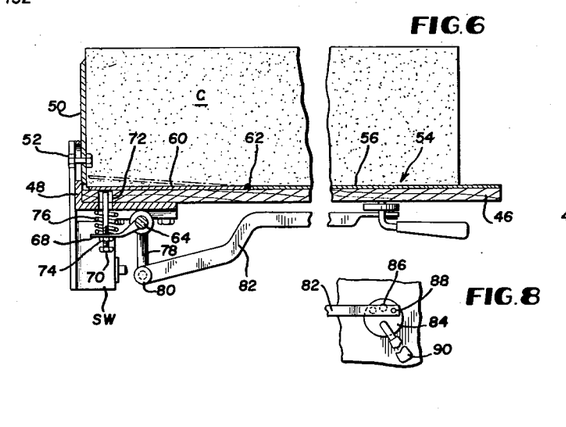
FIG. 6 is a detail cross-sectional view taken on the line 6—6 of FIG. 5.
FIG. 8 is a detail bottom plan view of an actuating mechanism.
Figure 7:
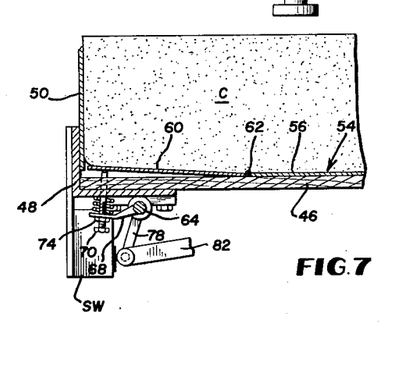
FIG. 7 is a detail cross-sectional view, similar to FIG. 6, showing parts in an alternate position.

As best seen in FIGS. 6 and 7, the forward portion of main plate 56 is connected to a hinge plate 60 by a hinge assembly 62 extending across the entire width of plate 56. Hinge plate 60 is moved between the normal position shown in FIG. 6 and the elevated position shown in FIG. 7 by structure which includes a shaft 64 extending beneath base plate 46 near the front edge of the plate and supported for rotation relative to base plate 46 by a plurality of pillow blocks 66 secured to the horizontal web of angle member 48. A pair of arms 68 are fixed to shaft 64 to support hinge plate elevating pins 70 which may take the form of conventional machine screws threadably received in arms 68 and projecting upwardly through the arms to pass freely through bores 72 formed in angle member 48 and base plate 46. Pins 70 are longitudinally fixed with respect to arms 68 as by lock nuts 74. A compression spring 76 is seated between the lower surface of angle member 48 and the upper surface of each arm 68 to normally bias the arm to the FIG. 6 position wherein the upper ends of pins 70 permit hinge plate 60 to lie flat against the upper surface of the base plate 46.

Figure 3:
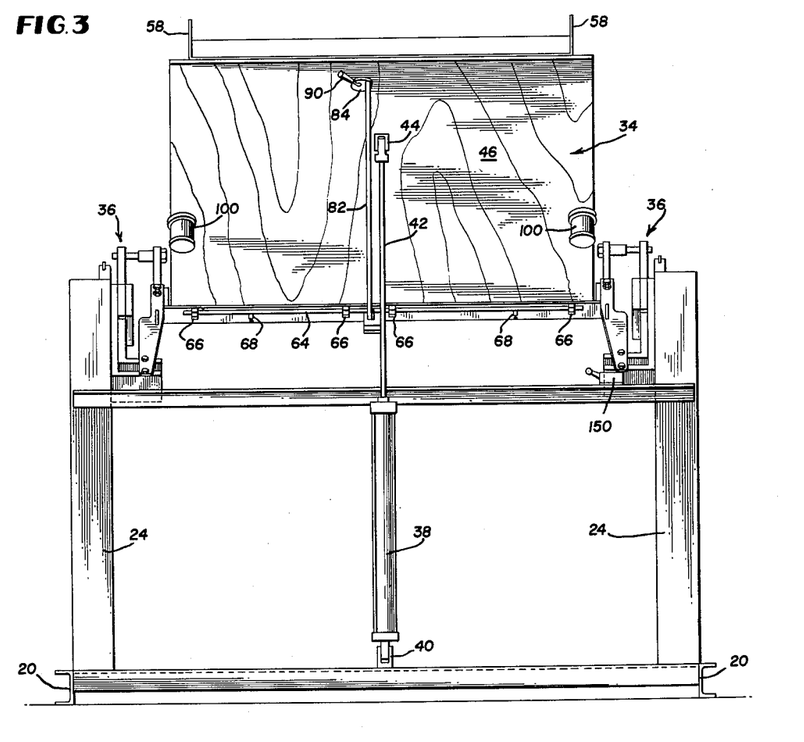
FIG. 3 is a front elevational view of the machine of FIG. 1 with the parts in the position shown in FIG. 2.

Midway between the ends of shaft 64, an actuating arm 78 is rigidly fixed to shaft 64 and pivotally connected at its outer end 80 to an actuating link 82. As best seen in FIG. 3, link 82 extends rearwardly beneath base plate 46 and is pivotally coupled at its outer end to a disk 84 which is eccentrically supported as at 86 for pivotal movement beneath base plate 46. The eccentric mounting of disk 84 permits the pivotal connection 88 between disk 84 and link 82 to be located in overcenter relationship in either of the two positions shown in FIG. 8. The full line position of pivot 88 in FIG. 8 corresponds to the position of the link shown in FIG. 6 while the broken line location of pivot 88 in FIG. 8 corresponds to the position of link 82 in FIG. 7. An operating handle 90 is fixed to disk 84 so that the machine operator may selectively locate hinge plate 60 in its upper (FIG. 7) or lower (FIG. 6) position for reasons discussed below. Since movement of hinge plate 60 between its upper and lower positions is quite small, an electrical switch SW is mounted below angle 48 to be closed when arm 78 is in the hinge plate elevating position of FIG. 7. Switch SW may be connected to an indicator light (not shown) to indicate that plate 60 is elevated.

Figure 4:
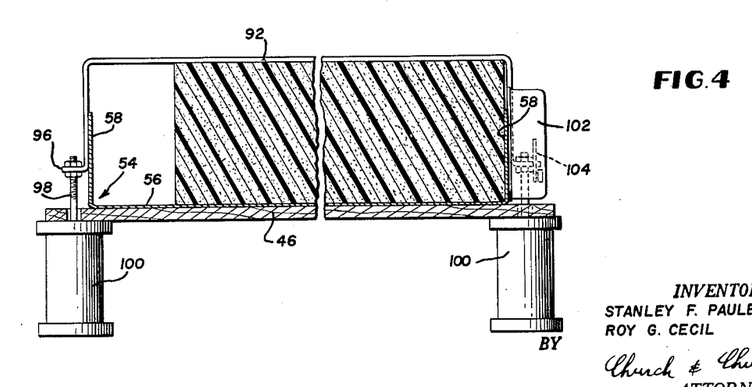
FIG. 4 is a detail cross-sectional view taken on line 4—4 of FIG. 2.

To hold a cushion blank in position upon table assembly 34, a clamp assembly is mounted on side plates 58. The clamp assembly includes a clamp member 92 formed of sheet material bent into the generally U-shaped configuration best shown in FIG. 4. The legs of clamp member 92 are slideably received in guides such as 94 fixedly secured to the outer sides of vertical side walls 54. An outwardly projecting tongue 96 on each leg of clamp member 92 is coupled to the piston rod 98 of an air motor assembly 100, the cylinder of the motor being fixedly attached to base plate 46. As best seen in FIGS. 3 and 4, two motors 100 are employed, one being connected to each of the opposed legs of clamp member 82. A clamp position detecting limit switch 102 is fixedly secured to the right-hand side wall 58 and includes a striker 104 extending into the path of the associated tongue 96 in a fashion such that striker 104 is depressed when clamp member 92 is in its cushion clamping position.

Figure 5:
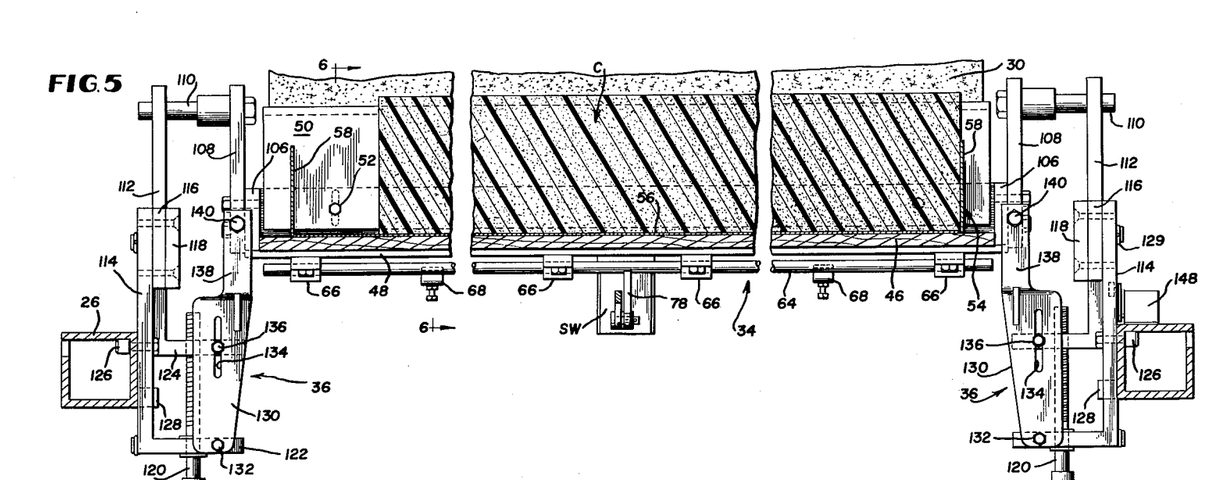
FIG. 5 is a detail cross-sectional view taken on the line 5—5 of FIG. 2.

Details of lever assemblies 36 are best shown in FIGS. 5 and 9–11. Referring first to FIG. 5, a metal block 106 is welded to angle member 48 at each end of the member. A rigid link 108 is bolted to each block 106 and projects vertically upwardly from the block in parallel relationship with front plate 50. Link 108 is formed with a plurality of bores 109 at fixed intervals so that the link may project upwardly from plate 46 by selected distances. The relationship established by the adjustable mounting of links 108 relative to plate 46 permits variation in the type of crowning and also serves as a coarse cushion blank thickness adjustment. At the upper end of each link 108, a pivot pin assembly 110 pivotally connects link 108 to the upper end of a second link 112. Link 112 is mounted for longitudinal sliding movement upon a third link 114 by a gib 116 and plate 118 assembly. Link 112 is longitudinally adjusted with respect to link 114 by an adjusting screw 120 mounted for free rotation in axially fixed relationship to an L-shaped projection 122 at the lower end of link 114 and threadably received in a similar L-shaped projection 124 on link 112. Elements 112–124 inclusive constitute a link of variable length which is pivotally supported upon the machine frame by a second pivot pin assembly 126 passing through the inner wall of the adjacent inclined box frame member 26. In the assembly of the machine, pivot assemblies 126 are accurately located and aligned with each other to define a single pivotal axis. Individual adjustment of screws 120 is then employed to accurately align pivot pin assemblies 110 with each other to define another pivotal axis parallel to the axis initially established by pivot pin assemblies 126 and located at an accurately established distance from the abrading surface.

Figure 9:
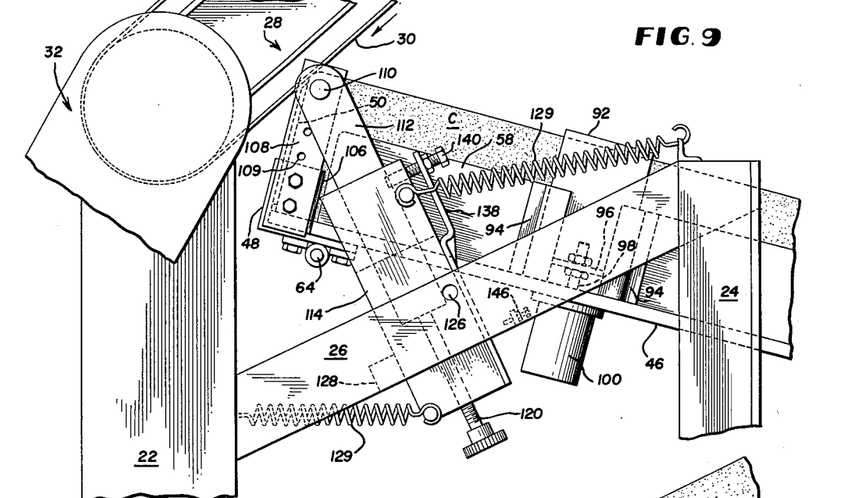
FIG. 9 is a detail left side elevational view of the table supporting structure with parts in a normal position.

As best seen in FIG. 9, the lever assembly including lever 114 is normally rotatively biased about pivot assembly 126 against a fixed stop 128 on frame member 26 as by tension springs 129 connected between lever 114 and conveniently locations upon the machine frame. This action has the effect of normally holding levers 114 and 112, and hence pivot 110, stationary so that initial pivotal movement of table assembly 34 relative to the machine takes place about the axis of pivot 110. To transfer the axis of pivotal movement of the table from pivot assemblies 110 to pivot assemblies 126, a bracket assembly 130 is mounted upon the L-shaped projections 122 and 124 of lengths 114 and 112 respectively. As best seen in FIG. 5, brackets 130 are bolted as at 132 to L-shaped projections 122 and an elongate slot 134 cooperating with the bolt 136 threaded into L-shaped projection 124 permits the longitudinal adjustment of the link 112 relative to link 114 while maintaining the bracket positions stationary relative to the associated pivot assembly 126. An offset arm 138 on each bracket projects outwardly to permit a stop screw 140 to be positioned in the path of link 108. When link 108 pivots into the position shown in FIG. 10, it engages the lower end of screw 140, and further pivotal movement of table assembly 34 is constrained to take place about the axis defined by pivot assemblies 126. An adjustment screw 146 is mounted upon each frame member 26 to determine the upper limit of pivotal movement of the table assembly. Arrival of the table at its upper limit of movement is detected by a limit switch 148 mounted on the right side box frame member 26 (FIG. 2) to be contacted by link 114 as link 114 moves into engagement with stop 146.

A limit switch 150 is mounted on the machine frame (FIGS. 2 and 3) to detect the presence of the table in its lowermost or rest position.

Figure 16:
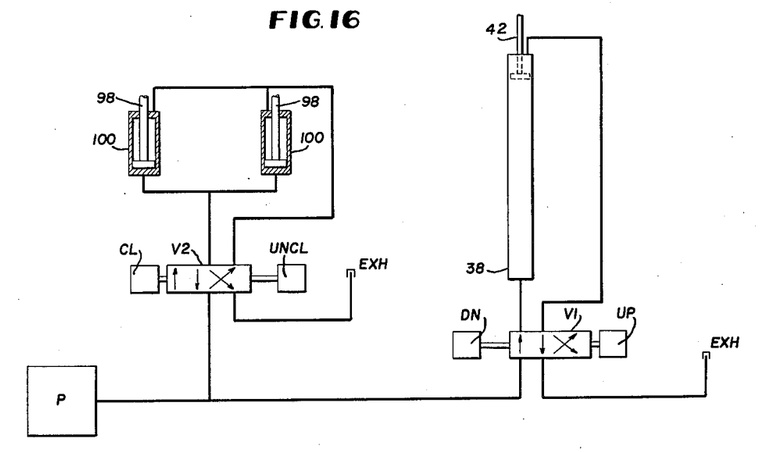
FIG. 16 is a schematic diagram of the pneumatic control system.

To operate the machine, motors 38 and 100 are connected to a source of air pressure P in the manner schematically illustrated in FIG. 16. Table operating motor 38 is connected to source P through a solenoid operated four-way reversing valve V1 of the momentary actuated locked position type. A similar valve V2 is connected to the motors 100, both motors 100 being connected in parallel. Valves V1 and V2 may be selected from many commercially available valves of this type in which the valve in one position supplies pressure to the rod end of the motor and vents the head end of the motor through an exhaust port EXH forming part of the valve. When in its alternate position, the valve reverses the connection to supply pressure to the head end of the cylinder and to vent the rod end. The valve is shifted from one position to the other by actuation of one of a pair of opposed solenoids coupled to the valve. Referring to valve V2, the valve is shown in the position it would assume if the solenoid CL were energized. Once moved to this position, the valve retains this position until the opposing solenoid UNCL is subsequently actuated. The solenoids CL and UNCL are energized to respectively actuate motors 100 in clamping and unclamping movement. Motor 38 is controlled by a similar actuation of solenoids DN and UP, respectively corresponding to the position of valve V1 in which the piston rod of motor 38 is driven down or up.

Figure 17:
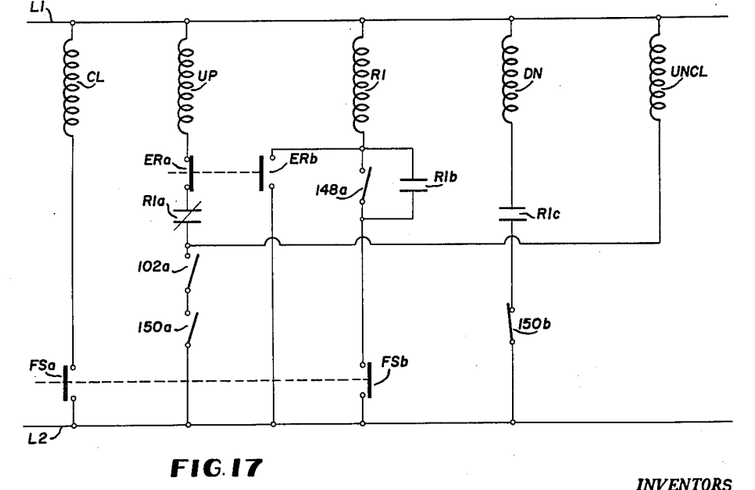
FIG. 17 is a schematic diagram of the electrical control system.

Control of the valve operating solenoids is accomplished by the electrical circuit disclosed in FIG. 17.

Operation of the electrical circuit of FIG. 17 is best understood by reference to the operating cycle of the machine. As an initial condition, it will be assumed that the table is in the lowered position of FIG. 1 with clamp member 92 in its elevated or unclamped position ready to receive a cushion blank C with belt drive assembly 32 operating to drive belt 30 in the direction indicated by arrow A in FIG. 1.

With the machine in the aforementioned condition, the striker of limit switch 150 will be depressed by virtue of the fact that the table is in its lowered position. The strikers of both limit switch 102 and limit switch 148 will be disengaged since clamp member 92 is in its upper or unclamped position and limit switch 148 is located to be contacted by the table only when the table is in its elevated position. In addition to the valve operating solenoids CL, UNCL, UP and DN referred to in the description of the pneumatic circuit, the electrical circuit of FIG. 17 includes a relay R1 to assist in controlling the cycle of operation.

To commence a cycle of operation, the operator places a cushion blank upon main plate 56 of the table assembly and slides the cushion forwardly across the table toward belt 30. In the usual case, the cushion blank C will be in the form of a rectangular parallelopiped and the operator slides the cushions forwardly until the forward side surface of the cushion abuts front plate 50 in face-to-face relationship. During the final portion of the sliding movement of the cushion blank, the forward side surface of the cushion is advanced against the moving belt.

Figure 12:
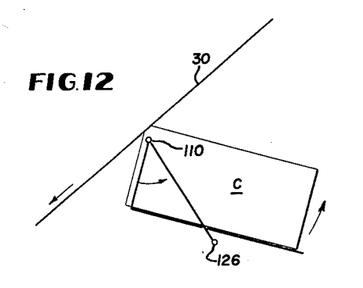
FIG. 12 is a schematic view showing the relationship between the cushion and belt sander, corresponding generally in position to the FIG. 9 position.

Preferably, the cushion blank is pushed firmly into engagement with front plate 50 in order that the plate may provide prompt support to the front surface of the blank to prevent tearing of the front side of the blank. If the cushion is compressed against the belt by this action, the resiliency of the material exerts a self-feeding action which is present throughout the abrading operation. The presence of front plate 50 and the movement of the belt through the cushion toward plate 50 are important in preventing the cushion blank from deep gouging and/or tearing. When the cushion is finally seated in face-to-face engagement with the front plate 50, the belt has abraded an inclined surface as best seen in FIG. 12. The initial relationship between the plane of the operating abrading surface of the belt 30 and the sides of the cushion blank C is such that the plane of the abrading surface intersects the plane of the front side surface of the cushion and the top surface of the cushion along parallel lines of intersection. The normal rest position of the table is such that the front side surface of the cushion intersects the plane of the abrading surface at a relatively small acute angle. In the rest position of the table, front plate 50 is normally adjusted vertically so that the upper edge of the front plate is in light contact with or closely adjacent to the abrading surface.

With the cushion positioned in the foregoing relationship to the belt 30, the operator depresses a foot switch FS (FIGS. 1 and 2) which, in the electrical diagram of FIG. 17, causes foot switch contacts FSa to be closed and simultaneously opens mechanically coupled contacts FSb. The closing of contacts FSa completes a circuit across supply lines L1 and L2 to energize clamping solenoid CL which in turn actuates valve V2 to the position shown in FIG. 16. This position of valve V2 supplies pressure to motors 100 to retract the piston rods 98 into the cylinders, thus pulling clamp member 92 downwardly to firmly clamp the cushion in position upon the table. Because of the position retaining action of valve V2, only a momentary depression of the foot switch is necessary to initiate the foregoing action. When clamp member 92 arrives in its clamping position, the striker of limit switch 102 is depressed to close normally open contacts 102a. Normally open contacts 150a are closed at this time since the striker of limit switch 150 is engaged by the presence of the table in its normal rest position. Closure of contacts 102a complete a circuit through valve control solenoid UP through normally closed contacts R1a and normally closed emergency return contacts ERa. Solenoid UP when energized shifts valve V1 to the position shown in FIG. 16, thus supplying pressure to extend piston rod 40 from its cylinder 38. This action drives the rearward portion of table assembly 34 upwardly from the FIG. 1 position toward the FIG. 2 position.

Figure 13:
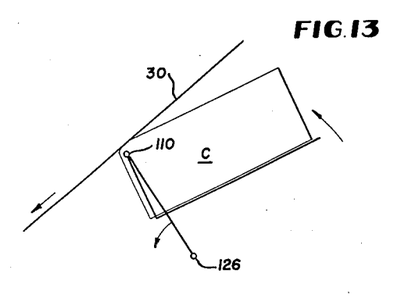
FIG. 13 is a schematic representation of the cushion and belt corresponding to FIG. 10.
Figure 14:
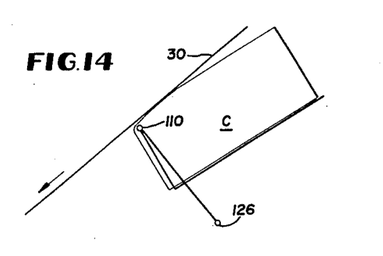
FIG. 14 is a schematic view of the cushion and belt corresponding generally to FIG. 11.

Movement of the table from the FIG. 1 position to the FIG. 2 position may best be followed by reference to the schematic diagrams of FIGS. 12–14. FIG. 12 is representative of the relative position of the cushion blank and abrading surface 30 when the table is at or near the rest position of FIG. 1. The relative positions of the parts of linkage assembly 36 at this time are best appreciated by reference to FIG. 9. Since springs 129 normally maintain links 114 and 112 in the angular position shown in FIG. 9 against stop 128, the initial movement of table assembly 34 away from the rest position of FIG. 1 takes place about the pivotal axis defined by pivot assembly 110. The axis of rotation defined by pivot assemblies 110 is located rearwardly of front plate 50 and is spaced upwardly above the cushion supporting surface of the table at a height less than the height of thickness of the cushion blank to be crowned. Thus, when the cushion blank is positioned upon the table, the axis of pivot assemblies 110 extend through the cushion behind the front side surface of the cushion and below the top surface of the cushion. In most cases, the radial distance from axis 110 to the front surface of the cushion will be less than the corresponding distance to the plane of the top surface of the cushion. This relationship permits the achievement of a longer crowned surface on the cushion—i.e. one which extends a relatively long distance rearwardly from the forward surface of the cushion. By varying the location of the axis of pivot assemblies 110 relative to the abrading surface, as by concurrent adjustment of screws 120, the configuration of the crown obtained may be varied.

Figure 10:
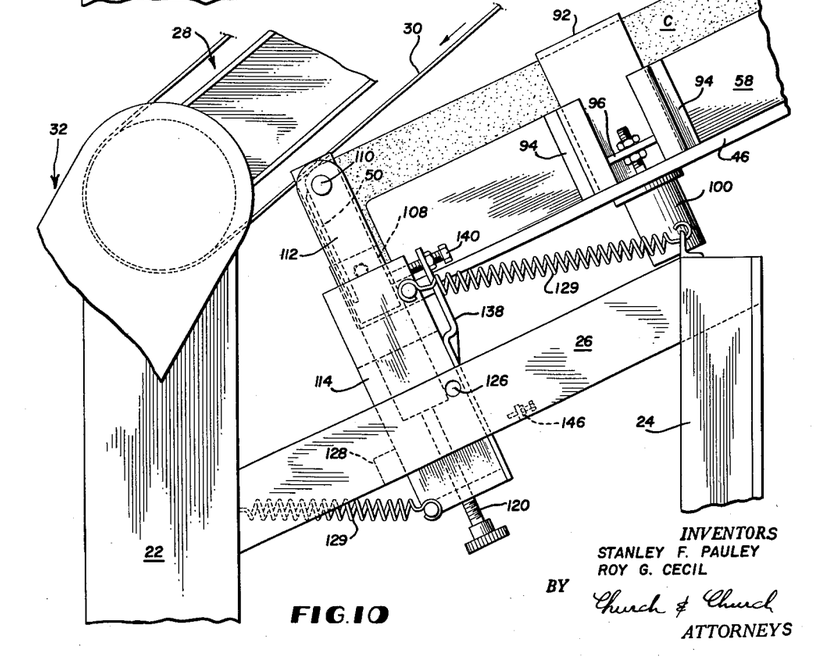
FIG. 10 is a view similar to FIG. 9 showing the parts in a subsequent position.
Figure 11:
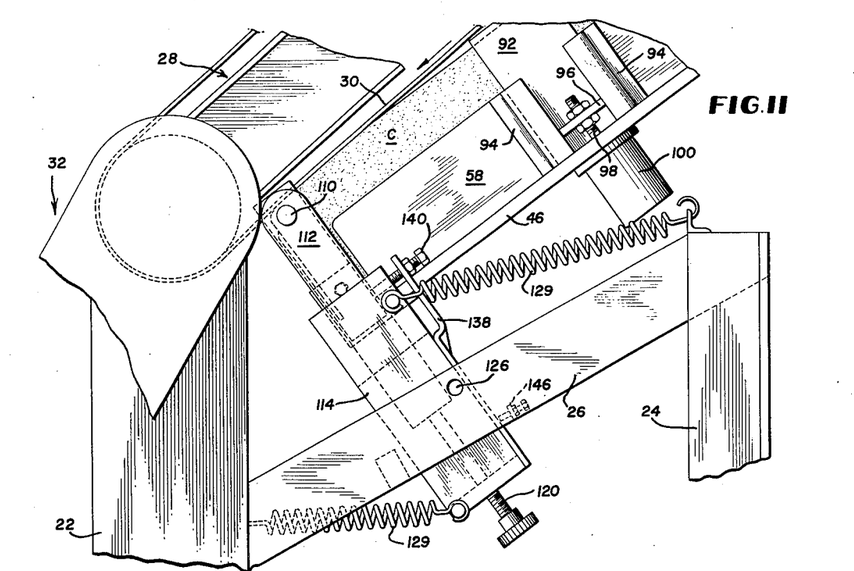
FIG. 11 is a view similar to FIG. 9 showing the parts in still another position.
Figure 15:
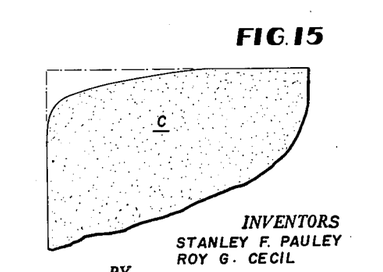
FIG. 15 is a partial schematic view showing details of the form of crown applied to the cushion.

Extending movement of piston rod 42 pivots table assembly 34 about the axis defined by pivot assemblies 110 until stop screw 140 on link assembly 112–114 engages link 108, this moment of engagement being shown in detail in FIG. 10 and schematically in FIG. 13. When stop screw 140 engages link 108, the end of the stop screw prevents further relative pivotal movement between links 108 and 112 and thus shifts the axis of pivotal movement of table assembly 34 from the axis defined by pivot pin assemblies 110 to the axis defined by pivot pin assemblies 126. Piston rod 40 continues to extend to drive the table assembly in pivotal movement about the axis of pivot pin assemblies 126 until the rod is fully extended, at which time links 114 swing into engagement with stop pin assemblies 146. During the pivotal movement of table assembly 34 about the axis of pins 126, belt 30 abrades a convexly curved surface upon the cushion blank of substantially longer radius as indicated in FIG. 15. Belt 30 does not move into parallel relationship with the top surface of the blank, the upper limit of pivotal movement of table assembly 34 about the axis of pins 126 being stopped at a relative position wherein the top surface of the blank intersects the plane of belt 30 at a relatively small acute angle. As best seen in FIG. 12, the relationship between the front side surface of the cushion blank and belt 30 at the initial or rest position of the table likewise achieves an intersection between the plane of the front surface and the plane of the belt which is at a relatively small acute angle. In theory, it would be desirable to minimize the angular intersection between the plane of the belt and the respective planes of the front and top surfaces of the blank since this would most smoothly blend the curved crowned surface into the planar surfaces of the blank. However, the relatively small angle of intersection is not objectionable since the cushions are usually covered with fabric after being crowned.

Returning to FIG. 17, when table assembly 34 reaches its upper limit of movement, the striker of limit switch 148 is contacted to close contacts 148a, thus energizing relay R1 through normally closed foot switch contacts FSb. When relay R1 is energized, it is locked in by lock in contacts R1b, closed when relay R1 is energized and by-passing limit switch contacts 148a. Relay R1, when energized, also opens contacts R1a and closes contacts R1c, the closing of contacts R1c energizing valve controlling solenoid DN through normally closed contacts 150b of the table down limit switch 150. Solenoid DN, when energized, shifts valve V1 from the FIG. 16 position to reverse the connections between motor cylinder 38 and the pressure and the exhaust lines.

The reversal of connections supplies pressure to the rod end of the motor cylinder 38 and vents the head end to drive piston rod 40 downwardly to return the table from its elevated position to its normal or rest position. Pivotal movement of table 34 toward the return position takes place successively about the axes of pivot assemblies 126 and 110 in a reversal of the foregoing movement.

When table assembly 34 returns to the normal or rest position of FIG. 1, the striker of limit switch 150 is again contacted and depressed to open contacts 150b, thereby de-energizing valve control solenoid DN. Contacts 150a are simultaneously closed to energize valve controlled solenoid UNCL through contacts 150a and contacts 102a which are closed since the clamp is in its clamping position. Solenoid UNCL when energized, reverses the valve V2 from the position shown in FIG. 16 to supply pressure to the head end of motor cylinders 100, thereby extending piston rods 98 from their respective cylinders to lift clamp member 92 to release the cushion. Valve controlled solenoid UP is not energized at this time, since normally closed contacts R1a are open by virtue of the fact that solenoid R1 is energized. As clamp member 92 moves upwardly away from its clamping position, the striker of limit switch is released and contacts 102a open to de-energize solenoid UNCL. Because of its position retaining action, valve V2 remains in the position to which it was driven by the energization of solenoid UNCL.

The operator then withdraws the cushion and turns it to present a new edge to the front plate 50 of table assembly 34 and the foregoing cycle is repeated until all of the edges of the cushion blank at the upper side of the blank are crowned.

Upon the crowning of the final upper edge of the cushion, the operator withdraws the blank from the machine and turns it over to perform the same operations upon the lower edges of the cushion. Because of the fact that the surfaces of the cushion now resting upon the support plate of the table assembly are crowned near their edges, the support afforded by the table is not present below the cushion adjacent the side in abutment with the front plate 50. To provide this support, the operator manually rotates disk 88 to drive hinge plate 60 from its normal position shown in FIG. 6 to the elevated position shown in FIG. 7. When in this position, hinge plate 60 firmly supports the crowned or curved surface portion of the cushion blank.

While one embodiment of the invention has been described, it will be apparent to those skilled in the art that the disclosed embodiment may be modified. Therefore, the foregoing description is to be considered exemplary rather than limiting and the true scope of the invention is that defined in the following claims.

We claim:
1. Apparatus for crowning a resilient foam cushion blank having upper and lower surfaces lying in parallel planes and perpendicular side surfaces, said apparatus comprising means defining a planar abrading surface, a table having a planar cushion blank supporting surface inclined toward said abrading surface and terminating at a front plate projecting perpendicularly from said supporting surface toward said abrading surface to an upper edge parallel to the plane of said supporting surface, said front plate projecting from said supporting surface to a height less than the thickness of said cushion blank, means supporting said table and said abrading surface for pivotal movement relative to each other about an axis extending parallel to said upper edge and located rearwardly of said front plate between said abrading surface and said supporting surface, means for locating a cushion blank upon said supporting surface with one side surface of said blank in face-to-face contact with said front plate and with the upper surface of said blank located above said axis and said one side surface of said blank located forwardly of said axis, and means for causing relative pivotal movement between said table and said abrading surface about said axis through an angular range of movement wherein the angle between said abrading surface and said supporting surface is greater than zero and less than 90°.

2. Apparatus as defined in claim 1 wherein said means supporting said table and said abrading surface includes means for adjusting the height of said front plate from said supporting surface to locate the upper edge of said front plate in contact with said abrading surface when said abrading surface and said supporting surface are located at their maximum angle of displacement.

3. Apparatus for crowning a resilient foam cushion blank having upper and lower surfaces lying in parallel planes and perpendicular side surfaces, said apparatus comprising means defining a planar abrading surface, a table having a planar cushion blank supporting surface terminating at a front edge adjacent to said abrading surface and extending parallel to the plane of said abrading surface, link means defining a first axis of relative pivotal movement between said abrading surface and said supporting surface, said first axis extending parallel to said front edge at a location between said abrading surface and said supporting surface, frame means supporting said link means defining said first axis for pivotal movement about a second axis extending parallel to said first axis at a location beyond said first axis from said abrading surface, means for locating a cushion blank upon said supporting surface with the upper surface of said blank located above said first axis and a side surface of said blank located in front of said first axis in parallel relationship to said front edge of said table, means normally locating said table and said abrading surface in respective positions wherein the angle between said abrading surface and said supporting surface is substantially equal to but less than 90°, and means for causing relative pivotal movement between said table and said abrading surface about said first axis until the angle between said abrading surface and said supporting surface is reduced to a predetermined acute angle and for subsequently rotating said link means about said second axis until the angle between said abrading surface and said supporting surface is reduced to a predetermined minimum angle.

4. Apparatus for crowning a resilient foam cushion blank having upper and lower surfaces lying in parallel planes and perpendicular side surfaces, said apparatus comprising means defining a planar abrading surface, a table having a planar cushion blank supporting surface inclined toward said abrading surface and terminating at a front plate projecting perpendicularly from said supporting surface toward said abrading surface to an upper edge extending parallel to the plane of said supporting surface, said front plate projecting from said supporting surface to a height less than the thickness of said cushion blank, link means defining a first axis of relative pivotal movement between said abrading surface and said supporting surface, said first axis extending parallel to said upper edge at a location rearwardly of said front plate and between said supporting surface and said abrading surface, frame means supporting said link means for pivotal movement about a second axis extending parallel to said first axis at a location beyond said first axis from said abrading surface, means for locating a cushion blank upon said supporting surface with one side surface of said blank in face-to-face contact with said front plate and with the upper surface of said blank located above said first axis and said one side surface located in front of said first axis, means normally locating said table and said abrading surface in respective positions wherein said upper edge of said front plate contacts said abrading surface and the angle between said abrading surface and said supporting surface is substantially equal to but less than 90°, and means for causing relative pivotal movement between said table and said abrading surface about said first axis until the angle between said abrading surface and supporting surface is reduced to a predetermined acute angle and for subsequently rotating said link means about said second axis until the angle between said abrading surface and supporting surface is reduced to a predetermined minimum angle.

5. Apparatus as defined in claim 4 including means on said link means for adjusting the distance between said first axis and said abrading surface, and means coupling said front plate to said table for adjusting the height of said front plate above said supporting surface to locate the upper edge of said front plate in contact with said abrading surface when said supporting surface is located at its maximum angular displacement from said abrading surface.

6. Apparatus as defined in claim 4 including a hinge plate mounted upon said table for pivotal movement about an axis parallel to said front plate and extending forwardly from said axis to said front plate, and means for selectively locating said hinge plate in a first position wherein said plate defines a planar continuation of said supporting surface and a second position wherein said plate is inclined upwardly and forwardly with respect to said supporting surface at an angle adapted to support a previously crowned surface of a cushion blank.

7. Apparatus for crowning a resilient foam cushion blank having upper and lower surfaces lying in parallel planes and perpendicular side surfaces, said apparatus comprising an endless abrasive belt operatively trained about a pair of end rolls, a frame supporting said end rolls for rotation about spaced parallel axes, said belt having a transverse width equal to or greater than the longest edge of a cushion blank to be crowned, a table having a planar cushion blank supporting surface inclined toward one run of said belt and terminating at a front plate projecting perpendicularly from said supporting surface toward said one run of said belt to an upper edge extending parallel to the axes of said end rolls, said front plate projecting from said supporting surface to a height less than the thickness of a cushion blank, means supporting said table upon said frame for pivotal movement about a first axis parallel to the axes of said end rolls located rearwardly of said front plate between said one run of said belt and said supporting surface, means for locating a cushion blank upon said supporting surface with one side surface of said blank in face-to-face contact with said front plate and with the upper surface of said blank located above said first axis and said one side surface of said blank located forwardly of said first axis, means normally locating said table at a rest position wherein the angle between said supporting surface and abrading surface is substantially equal to but less than 90°, with the upper edge of said front plate in contact with said abrading surface, means for driving said belt in a direction to move said one run of said belt downwardly and forwardly across said upper edge of said front plate, and means for driving said table in pivotal movement about said first axis until the angle between said supporting surface and said one run of said belt reaches a selected minimum acute angle.

8. Apparatus as defined in claim 7 wherein said means supporting said table upon said frame comprises link means pivotally coupled at one end to said table to define said first axis, means pivotally supporting the other end of said link means upon said frame for pivotal movement relative to said frame about a second axis parallel to said first axis and located beyond said first axis from said abrading surface, means restraining said link means against pivotal movement about said second axis when the angle between said supporting surface and said table is greater than said selected minimum acute angle, said means for driving said table in pivotal movement about said first axis being operable when the angle between said supporting surface and said one run of said belt is reduced to said selected minimum angle to drive said table in pivotal movement about said second axis to further reduce the angle between said supporting surface and said one run of said belt.

9. Apparatus as defined in claim 8 including means on said link means for adjustably locating said first axis at selected distances from the surface of said belt, and means coupling said front plate to said table for adjusting the height of said front plate to locate said upper edge of said front plate in contact with said abrading surface when said table is at said rest position.

10. Apparatus as defined in claim 8 including a hinge plate mounted upon said table for pivotal movement about an axis parallel to said front plate and extending forwardly from said axis to said front plate, and means for selectively locating said hinge plate in a first position wherein said plate defines a planar continuation of said supporting surface or a second position wherein said plate is inclined upwardly and forwardly with respect to said supporting surface at an angle adapted to support a previously crowned surface of a cushion blank.

11. Apparatus for crowning a resilient foam cushion blank having upper and lower surfaces lying in parallel planes and perpendicular side surface intersecting said upper and lower surfaces at corner edges, said apparatus comprising a frame, a pair of spaced parallel links each mounted at one end on said frame for pivotal movement about a common horizontal first axis, stop means on said frame confining pivotal movement of said links about said first axis to an arc wherein said links are inclined upwardly and forwardly from said first axis, a table having a planar cushion blank supporting surface terminating at front and rear edges having a length greater than the longest corner edge of a cushion blank to be crowned, means adjacent the front end of said table coupling said table between the other ends of said links for pivotal movement relative to said links about a second axis parallel to said first axis, means for securing a cushion blank to be crowned upon said table with the lower surface of said blank in face-to-face engagement with said supporting surface at a location wherein said second axis passes through said blank in parallel relationship to one upper corner edge of said blank, means on said frame defining an abrading surface having a horizontal width equal to or greater than the longest corner edge of a blank to be crowned, said abrading surface lying in a plane inclined downwardly and forwardly above said second axis in parallel relationship thereto and passing between said second axis and the position assumed by said one upper corner edge of a blank secured upon said table by said securing means, means normally locating said table in a rest position wherein the plane of said supporting surface passes below said second axis and converges with the plane of said abrading surface at a relatively large acute angle, and means for driving said table from said rest position in pivotal movement about said first axis until the angle between said supporting surface and said abrading surface is reduced to a selected minimum angle and for subsequently driving said table in pivotal movement about said second axis until the angle between said supporting surface and said abradng surface approaches zero degrees.

12. Apparatus as defined in claim 11 wherein the plane of said abrading surface is located upon said frame in fixed relationship to said first axis, and means upon said parallel links for adjustably increasing and decreasing the length of said links to thereby adjust the distance between said second axis and the plane of said abrading surface.

13. Apparatus as defined in claim 11 including a front plate mounted on said table and projecting perpendicularly upwardly from said supporting surface to a horizontal upper edge located to contact said abrading surface when said table is in said rest position.

14. Apparatus as defined in claim 11 wherein said table includes a hinge plate mounted upon the front portion of said table for pivotal movement about a horizontal axis lying in the plane of said supporting surface, means normally locating said hinge plate in the plane of said supporting surface, and means for locating said hinge plate in an elevated position inclined upwardly and forwardly from the plane of said supporting surface at an angle adapted to provide support for a previously crowned surface of a cushion blank.

15. Apparatus as defined in claim 12 including a front plate on said table adapted to engage the side surface of a cushion blank secured upon said table, said front plate projecting perpendicularly from said supporting surface, and means for adjusting the height of said front plate from said supporting surface to locate the upper edge of said front plate in contact with said abrading surface when said table is in said rest position.

16. Apparatus for crowning a corner edge of a resilient foam cushion blank, said corner edge being defined by the intersection of two flat surfaces on said blank, said apparatus comprising an endless belt sander assembly including an endless abrasive belt having an operative run defining a planar abrading surface, a table having a cushion blank supporting surface inclined relative to said abrading surface and terminating at a front edge extending in spaced parallel relationship with said abrading surface, means supporting said sander assembly and said table for pivotal movement relative to each other about an axis extending parallel to said front edge at a location within the angle included between said abrading surface and said supporting surface, means normally locating said table and said sander assembly in a first position relative to each other wherein the angle included between said abrading surface and said blank supporting surface is substantially equal to, but less than, 90°, guide means on said table operable when said table is in said first position for guiding the corner edge of a blank to be crowned into engagement with said abrading surface while maintaining said corner edge in parallel relationship with said abrading surface and said axis, and means for angularly oscillating said table and said sander assembly relative to each other about said pivotal axis to shift said table from said first position to a second position relative to said abrading surface wherein the angle included between said abrading surface and said supporting surface is substantially less than 90°, to thereby abrade a convexly curved crown surface on said cushion blank between said flat surfaces of said blank.

17. Apparatus for crowning a resilient foam cushion blank having upper and lower surfaces lying in parallel planes and perpendicular side surfaces, said apparatus comprising a table having a planar cushion blank supporting surface terminating at a front edge, means for locating a cushion blank upon said supporting surface with a side surface of said blank extending parallel said front edge of said table, means supporting said table for pivotal movement about an axis extending above said table in parallel relationship with said front edge of said table at a location within the angle included between the last mentioned side surface of said blank and its upper surface when the blank is located on said table by said locating means, means limiting pivotal movement of said table about said axis between a normal position and elevated position angularly separated from each other by less than 90°, and an endless belt sander assembly including an endless abrasive belt having an operative run defining a flat abrading surface lying in a plane extending parallel to said axis and inclined relative to said supporting surface when in its normal position at an included angle slightly less than 90°, said abrading surface being spaced from said axis by a radial distance approximately equal to the radial distance from said axis to the last mentioned side surface of a blank located on said table by said locating means, and means for pivoting said table about said axis between said normal position and said elevated position to abrade a convexly curved surface between the last mentioned side surface and the upper surface of a blank located on said table by said locating means.

18. Apparatus as defined in claim 17 wherein said locating means comprises a front plate on said table extending normal to said supportng surface along said front edge, said plate having an upper edge engageable with said abrading surface when said table is in said normal position, said sander assembly including means for driving said belt in a direction such that said belt passes forwardly across said upper edge.

References Cited in the file of this patent
UNITED STATES PATENTS
2,578,789    Donnoelly _____________ Dec. 18, 1951